United States Patent Office 3,686,265
Patented Aug. 22, 1972

3,686,265
AMMONOXIDATION OF OLEFINS
Philippe Reulet, Mourenx, and Alain Pfister and Jacques Tellier, Pau, France, and Jean Blanc, Holte, and Kirsten Borre Jorgensen and Hans Bohlbro, Lingby, Denmark, assignors to Societe Nationale des Petroles d'Aquitaine Tour, Courbevoie, France
No Drawing. Filed Jan. 21, 1969, Ser. No. 792,751
Claims priority, application France, Jan. 22, 1968, 136,842
Int. Cl. C07c 121/02, 121/32
U.S. Cl. 260—465.3
9 Claims

ABSTRACT OF THE DISCLOSURE

A new and improved procedure is provided for producing unsaturated nitrils and particularly, acrylonitrile, by a process involving contacting, at a temperature between 300° and 600° C., for a period of time of 0.15 to 15 seconds, a mixture of ammonia, oxygen and an olefin such as a lower alkene and particularly, propylene, with a catalyst containing as the active material, silicomolybdic acid and recovering the desired nitrile product thus formed.

BACKGROUND OF THE INVENTION

(1) Field of the invention

This invention relates to the production of nitrogen-containing derivatives of olefins by a procedure involving oxidation of the aforesaid compounds, in the presence of ammonia. The invention is more particularly concerned with the manufacture of unsaturated nitriles and particularly, acrylonitrile. The invention is also concerned with a new and improved catalyst which is used in the process for the manufacture of nitriles.

(2) Description of the prior art

The oxidation of olefins in the presence of ammonia and particularly the oxidation of such olefins as lower alkenes and particularly, propylene, is well-known. Among the catalysts which have been employed in the aforesaid oxidation procedure are phosphomolybdates of different metals such as, for example, tellurium, bismuth, and the like. However, the prior are procedures were undesirable since they required long contact periods between the reacting gases and the catalyst mass which was in the order of, for example, as much as 50 seconds. Further, aside from the extended required contact time, the conversion of the lower alkene to the desired nitrile was rather low, i.e., in the order of about 25% and the prior art procedures were also objectionable in that undesirable by-products were former in substantial yields thereby unduly complication the recovery procedure for the desired product. Still further, the prior art catalysts were also characterized by a noticeable lack of stability and consequently, the conversion of the lower alkene to the desired product, as well as selectively and yield were adversely affected to a considerable extent.

It is, accordingly, among the objects of the present invention to provide a new and improved procedure for the production of unsaturated nitriles thereby avoiding the disadvantages associated with the prior art procedures. It is also an object of the present invention to provide a new and improved catalyst which is useful in converting lower alkene compounds to the desired unsaturated nitrole products. Other objects and advantages of the invention will be apparent from the following description of the preferred embodiments.

SUMMARY OF THE INVENTION

In accordance with the process of the present invention, unsaturated nitriles are obtained by contacting, at a temperature in the range of 300° to 600° C., for a period ranging between 0.15 and 15 seconds, (a) a mixture comprising a lower alkene, ammonia and oxygen with (b) a catalyst containing as the active material, silicomolybdic acid, followed by recovery of the desired nitrile product thus formed. The present invention is significant in that it represents a surprising and unexpected discovery in that, by replacing the conventional phosphomolybdate heteroplyanion catalysts by a silicomolybdate, there is obtained a substantial increase in activity insofar as the production of the desired nitriles is concerned together with increased selectivity. The increase in selectively is responsible for a significant reduction in the long contact periods usually required between the reacting masses and the catalyst mass and accompanying the reduction in the contact period, there is also obtained a marked increase in yield of the desired nitrile products.

The present invention also provides a new and novel catalyst which is useful in the production of unsaturated nitriles starting with a lower alkene and the catalyst of the present invention is characterized by the fact that it contains, as the active material, silicomolybdic acid. More particularly, the catalyst of the present invention comprises silicomolybdic acid in partial combination with hexavalent tellurium oxide.

PREFERRED EMBODIMENTS OF THE INVENTION

While the present invention covers the production of nitrogen-containing derivatives of olefins, it is particularly directed to the production of unsaturated nitriles and, particularly, acrylonitrile, by a procedure involving the oxidation of an olefin, and particularly a lower alkene, in the presence of ammonia. In preparing one nitrile product of the present invention that is, acrylonitrile, propylene is used as the starting material.

The novel and improved silicomolybdic acid catalyst of the present invention contains a substantial amount of hexavalent tellurium oxide, particularly in the form of tellurium silicomolybdate, said tellurium oxide comprising a significant portion of the silicomolybdic acid which is used in the process. Catalysts providing excellent results contain from 10 to 14 moles of $MoO_3$ and 5 to 10 moles of $TeO_3$ per mole of combined $SiO_2$.

The heteropolyanionic combination comprising the catalyst of the present invention is represented by the formula

$$sSiO_2 \cdot mMoO_3 \cdot tTeO_3$$

wherein the molar ratio of $m:s$ is between 6 and 24 and usually between 10 and 14, and the molar ratio of $m:t$ is between 0.5 and 12 and usually, between 1 and 2.8.

It has also been found that the results obtained by the catalysts of the present invention are greatly improved, when the catalyst contains, as an additional ingredient, iron, and the formula of such a catalyst is, illustratively,

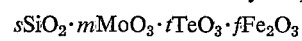

$$sSiO_2 \cdot mMoO_3 \cdot tTeO_3 \cdot fFe_2O_3$$

the ratio $m:f$ varying between 3 and 72 and usually between 12 and 24.

The catalyst of the present invention is employed on a porous support or substrate such as, for example, kaolin, alumina, a silica such as, for example, kieselguhr, a silica formed by drying and burning an aqueous silica sol, and the like. The proportion, by weight, of the substrate is generally between 25 and 75% of the total catalyst composition and usually in the order of 40–60%. One preferred catalyst of the present invention composition contains 75–25 parts by weight of tellurium silico-molybdate containing 10–14 moles $MoO_3$ and 5–10 moles of $TeO_3$ per mole of combined $SiO_2$, and 25–75 parts of a substrate selected from the group consisting of kaolin, alumina and a silica.

In preparing the catalyst used in the present process, it is necessary that the silicomolybdic acid and/or the tellurium silicomolybdate, iron or tellurium must be formed before incorporation into the support or substrate. In one particularly advantageous form, the silicomolybdic acid catalyst is used in its hydrated form in order that it should be incorporated into the support or substrate; the support should preferably also be in the hydrated state and one particularly useful form of the support is, in the form of an aqueous sol.

In preparing the catalyst, a preferred procedure involves the addition, to a silica sol containing 5–10% $SiO_2$, of the required quantity of silicomolybdic acid, telluric acid and an iron compound or even the corresponding silicomolybdate; the resulting liquid is dried at about 120° C. for a time sufficient to transfer it into a porous solid this period is usually about 24 hours. The porous mass is then calcined at a temperature between 400° and 500° C. for a period of 24 hours; the preferred calcining temperature is about 450° C.

The ammonoxidation reaction of the starting olefin compound is effected by passing the mixture containing the olefin and particularly the lower-alkene together with the oxygen ammonia, over the catalyst. The proportion of the lower alkene starting material in the starting mixture is preferably between 1 and 15% by volume while the proportion of ammonia is preferably between 1 and 15% by volume while that of oxygen is between 2 and 14% by volume, the remainder of the mixture containing one or more inert gases. The molecular oxygen can be used in the form of oxygen or oxygen diluted with an inert gas such as nitrogen, steam or a mixture thereof. Air, or a mixture of air and oxygen or a mixture of air and an inert dilution gas can conveniently be employed in the process for the production of the unsaturated nitrile and particularly the production of acrylonitrile.

In producing the desired nitrile product, in the process of the present invention, it is important that the proportion of oxygen be maintained below 15% by volume of the gaseous mixture, for reasons of safety, that is, in order to avoid an explosion. On the other hand, it is particularly advantageous for the mixture of gases to contain from about 5 to about 25% steam.

The reaction of the oxygen and ammonia with the starting olefin compound occurs at a temperature between about 300° and about 600° C. and particularly, at a temperature between about 380° C. and about 450° C. The contact time of the gaseous mixture and the catalyst can vary depending upon the temperature used; generally, the contact period is between about 0.15 and about 15 seconds and preferably, in the order of about 3 to about 10 seconds.

The following examples illustrate the advantages obtained by using the catalyst of the present invention, as compared with the prior art catalysts. Particularly illustrated are the improved conversion and selectivity obtained by using the catalyst of the present invention. The examples also show the improvement in the stability of the catalyst obtained by the addition of iron to the active heteropolyanionic substance.

EXAMPLES 1–3

The catalysts are prepared by mixing an aqueous solution of the selected heteropolyanionic acid with an aqueous silica sol, followed by drying the mixture at 120° C. for 24 hours and then calcining at 450° C. for 24 hours.

Disregarding the water of the solutions, each of the mixtures used in the preparation of the catalyst contains 50% by weight of active heteropolyanionic acid and 50% by weight of $SiO_2$ as support.

The activity test is carried out in a tube with a diameter of 12 mm. containing a batch of 10 ml. of catalyst composition, kept at 400° C. A mixture of propylene, ammonia, oxygen and steam, in which the volumetric ratio $O_2/C_3H_6$ is 1.5 and $C_3H_6/NH_3=1$, is caused to pass thereover; the partial pressure of the steam which is present is 0.125 atmosphere.

On leaving the catalysis tube, the acrylonitrile and acetonitrile which are formed are measured; the effluent gases also contain carbon monoxide and carbon dioxide gas.

The results are set out in the following Table I.

TABLE I

| Example number | 1 | 2 | 3 |
|---|---|---|---|
| Heteropolyanionic acid used in the catalyst | (¹) | (¹) | (²) |
| Contact time in seconds | 3 | 6 | 6 |
| Percent conversion of the propylene | 19 | 25 | 9 |
| Percent selectivity: | | | |
| Acrylonitrile | 59 | 59 | 25 |
| Do | 24 | 24 | 48 |

¹ Silicomolybdic $H_4SiMo_{12}O_{40}$.
² Phosphomolybdic.

The results set out above clearly indicate that the conversion of the propylene and the proportion of the formed acrylonitrile products are substantially increased by replacing the phosphomolybdic catalysts of the prior art by the new and improved silicomolybdic acid catalyst.

EXAMPLE 4

A silicomolybdic catalyst is prepared as in Examples 1 and 2 supra, but with the addition of telluric acid.

The proportions by weight of the materials, without taking the water of the solutions into account, are:

Active substance: 25% $H_4SiMo_{12}O_{40}$ and 25% $H_6TeO_6$
Support: 50% $SiO_2$ The active substance thus contains 12 moles of $MoO_3$ and 7.95 moles of $TeO_3$ per mole of $SiO_2$ corresponding to the ratios of $m/s=12$ and $m/t=1.52$, in accordance with the formula given above.

Using the same test conditions as in the Examples 1–3, a contact time of 6 seconds is used; the calculation of the formed compounds took place after the catalyst had been in use for periods of four, six, twenty-four and forty hours.

The results are set out in the following Table II.

TABLE II

| Operation period in hours | 4 | 6 | 24 | 40 |
|---|---|---|---|---|
| Conversion of propylene (percent) | 52 | 47 | 39 | 33 |
| Selectivity (percent): | | | | |
| Acrylonitrile | 70 | 74 | 65 | 53 |
| Acrolein | 2.5 | 2.8 | | 4 |
| Acetonitrile | 8 | 8.6 | 11 | 11 |
| Yield (percent): | | | | |
| Acrylonitrile plus acrolein | 38 | 36 | 24 | 19 |
| Acetonitrile | 4 | 4.2 | 4.3 | 4.6 |

During the initial hours of the ammonoxidation, the catalytic activity and the selectivity experience a certain decline; the conversion tends towards a value of about 30 to 33% after 40 hours, and the proportion of arylonitrile obtained is then 5 times greater than that of acetonitrile.

EXAMPLES 5 AND 6

These examples show the improvement in the stability of the catalyst of Example 4 as a result of the addition of iron to the active heteropolyanionic substance.

The catalyst is prepared as in Example 4, but the silicomolybdic acid is replaced by iron silicomolybdate

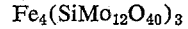

$Fe_4(SiMo_{12}O_{40})_3$

The active substance thus contains, per mole of $SiO_2$, 12 moles of $MoO_3$, 8.22 moles of $TeO_3$ and 0.666 mole of $Fe_2O_3$; the ratios are $m/s=12$, $m/t=1.45$ and $m/f=18$.

Using the same conditions as in the preceding examples, two series of ammonoxidation procedures are carried out for 80 hours; one with a contact time of 3 seconds and the other with a contact time of 6 seconds.

Measurements are made in each case after 5 and 80 hours.

The results are set out in Table III below.

TABLE III

| | Example Number | | | |
|---|---|---|---|---|
| | 5 | | 6 | |
| Operation period, hours | 5 | 80 | 5 | 80 |
| Contact time in seconds | 3 | 3 | 6 | 6 |
| Percent conversion of propylene | 42 | 40 | 55 | 53 |
| Percent selectivity: | | | | |
| Acrylonitrile | 81 | 85 | 81 | 84 |
| Acrolein | 12 | 9 | 9 | 5 |
| Acetonitrile | 3 | 3 | 2 | 2 |
| Percent yield: | | | | |
| Acrylonitrile | 34 | 34 | 44.5 | 44.5 |
| Acrylonitrile plus acrolein | 39 | 38 | 49.5 | 47 |

The introduction of iron into the silicomolybdic catalyst provides an outstanding stability, and in practice the activity of the catalyst no longer varies as a function of time during the operation of the catalyst.

EXAMPLES 7 AND 8

These examples show the improvement in the conversion and the selectivity as compared with the catalyst used in Examples 5 and 6 by adjusting the operative conditions, particularly an adjustment of the temperature and of the proportion of water in the reaction mixture.

Table IV sets out the results of tests which were carried out with the catalyst containing iron silicomolybdate and tellurium silicomolybdate, prepared according to the procedure of Examples 5 and 6.

The temperature used is 430° C. and the contact time with the catalyst is 5.7 seconds; the operation was 100 hours.

In Example 7, the gaseous mixture to be treated is practically dry, while in Example 8, it contains 11.8% by volume of steam.

TABLE IV

| Example number | 7 | 8 |
|---|---|---|
| Composition of the gas, percent by volume: | | |
| $C_3H_6$ | 6 | 5.3 |
| $NH_3$ | 6 | 5.3 |
| $O_2$ | 12 | 10.6 |
| $N_2$ | 76 | 67 |
| $H_2O$ | | 11.8 |
| Percent conversion of propylene | 69 | 63 |
| Selectivity (percent) | | |
| Acrylonitrile | 74 | 90 |
| Acrolein | 10 | 2 |
| Acetonitrile | 3 | 3 |
| Yield (percent): | | |
| Acrylonitrile | 51 | 57 |
| Acrylonitrile plus acrolein | 58 | 58 |

The results indicate that the catalyst containing iron and tellurium silicomolybdate is not only very stable, but is also capable of producing acrylonitrile, with very good selectivity, when there is sufficient steam in the treated gaseous mixture. The raising of the temperature to 430° C. results in a conversion of more than 60%.

We claim:

1. In the method of producing acrylonitrile which comprises contacting, at a temperature in the range of 300°–600° C., for a period between 0.15 and 15 seconds, a mixture of propylene, ammonia and oxygen with a catalyst, the improvement which comprises employing a catalyst selected from the group consisting of the tellurium salts and the iron salts of $H_4SiMo_{12}O_{40}$, and mixtures thereof.

2. A method according to claim 1, wherein the composition of the gaseous mixture is, in percent by volume, 1%–15% propylene, 1%–15% ammonia and 2%–14% oxygen, the remainder constituting an inert gas.

3. A method according to claim 2, wherein the inert gas is nitrogen, steam or a mixture thereof.

4. A method according to claim 1, wherein the catalyst is supported on a substrate selected from the group consisting of kaolin, alumina and silica.

5. A method according to claim 4, wherein the substrate is silica.

6. A method according to claim 1, wherein the catalyst is the tellurium salt of $H_4SiMo_{12}O_{40}$.

7. A method according to claim 1 wherein the catalyst is a mixture of the tellurium and iron salts of $H_4SiMo_{12}O_{40}$, the reaction temperature is in the range of 380°–450° C. and the contact time is between 3 and 10 seconds.

8. A method according to claim 7 wherein the volumetric ratio of oxygen to propylene is about 1.5 and the volumetric ratio of propylene to ammonia is about 1.

9. A method according to claim 8 wherein the gaseous mixture used contains from 5%–25% steam.

References Cited

UNITED STATES PATENTS

| | | | |
|---|---|---|---|
| 2,450,675 | 10/1948 | Marisic et al. | 260—465.3 |
| 3,086,041 | 4/1963 | Hadley et al. | 260—465.3 |
| 3,164,625 | 1/1965 | Minekawa et al. | 260—465.3 |
| 3,365,482 | 1/1968 | Khoobiar | 260—465.3 |
| 3,478,082 | 11/1969 | Huibers | 260—465.3 |
| 3,200,141 | 8/1965 | Milberger | 260—465.3 |
| 3,354,197 | 11/1967 | Callahan et al. | 260—465.3 |
| 3,471,545 | 10/1969 | Giordano et al. | 260—465.3 |

FOREIGN PATENTS

| | | | |
|---|---|---|---|
| 848,924 | 9/1960 | Great Britain | 260—465.3 |

JOSEPH P. BRUST, Primary Examiner

U.S. Cl. X.R.

252—439, 458